US012759851B2

(12) United States Patent
Inagaki et al.

(10) Patent No.: US 12,759,851 B2
(45) Date of Patent: Oct. 13, 2026

(54) CART AND TRANSPORT DEVICE

(71) Applicant: FUJI CORPORATION, Chiryu (JP)

(72) Inventors: Shigeyoshi Inagaki, Yokkaichi (JP); Hidetoshi Kawai, Anjo (JP)

(73) Assignee: FUJI CORPORATION, Chiryu (JP)

( * ) Notice: Subject to any disclaimer, the term of this patent is extended or adjusted under 35 U.S.C. 154(b) by 309 days.

(21) Appl. No.: 18/684,506

(22) PCT Filed: Sep. 10, 2021

(86) PCT No.: PCT/JP2021/033326
§ 371 (c)(1),
(2) Date: Feb. 16, 2024

(87) PCT Pub. No.: WO2023/037498
PCT Pub. Date: Mar. 16, 2023

(65) Prior Publication Data
US 2024/0375923 A1 Nov. 14, 2024

(51) Int. Cl.
*B66F 9/06* (2006.01)
*B62B 3/04* (2006.01)
*B62B 5/00* (2006.01)

(52) U.S. Cl.
CPC ................ *B66F 9/063* (2013.01); *B62B 3/04* (2013.01); *B62B 5/0006* (2013.01)

(58) Field of Classification Search
CPC ......... B66F 9/063; B62B 3/04; B62B 5/0006; B60K 2001/0455
See application file for complete search history.

(56) References Cited

U.S. PATENT DOCUMENTS 4,496,274 A * 1/1985 Pipes ...................... B66F 9/063 180/68.5
4,861,220 A * 8/1989 Smith ..................... B60P 1/649 414/498
(Continued)

FOREIGN PATENT DOCUMENTS

JP 05-265551 A 10/1993
JP 08-91155 A 4/1996
(Continued)

OTHER PUBLICATIONS

International Search Report issued Nov. 9, 2021 in PCT/JP2021/033326 , filed on Sep. 10, 2021, 2 pages.

*Primary Examiner* — Jeffrey J Restifo
(74) *Attorney, Agent, or Firm* — Oblon, McClelland, Maier & Neustadt, L.L.P.

(57) ABSTRACT

A cart includes a cart main body having a loading platform on which a transport object is placed and a traveling wheel, a coupling section configured to determine a position of the cart main body in a left-right direction with respect to a transport vehicle in a state of entering a lower side of the cart main body and couple the cart main body to the transport vehicle so that the cart main body is pulled while allowing a posture change of the cart main body with respect to the transport vehicle, and a bumper section provided on a front of the cart main body in a front-rear direction, and configured to determine the position of the cart main body at a predetermined position in the front-rear direction by coming into contact with a reference surface provided at a transport target at at least two points separated in the left-right direction when the cart main body is pulled by the transport vehicle and moves to the transport target and cause the cart main body to directly face the reference surface.

16 Claims, 7 Drawing Sheets

(56) References Cited

U.S. PATENT DOCUMENTS

| | | | | | |
|---|---|---|---|---|---|
| 5,274,984 | A * | 1/1994 | Fukuda | B65B 41/16<br>414/908 |
| 6,070,679 | A * | 6/2000 | Berg | B62D 51/04<br>280/DIG. 4 |
| 8,165,718 | B2 * | 4/2012 | Ota | B66F 9/063<br>700/250 |
| 8,684,373 | B2 * | 4/2014 | Holtan | B62B 5/0006<br>280/47.11 |
| 9,517,899 | B2 * | 12/2016 | Watt | B65G 67/26 |
| 11,407,588 | B2 * | 8/2022 | Durai | B65G 1/0471 |
| 11,485,575 | B2 * | 11/2022 | Dooley | B66F 7/0625 |
| 11,592,815 | B2 * | 2/2023 | Armbrust | B62B 5/0069 |
| 12,371,257 | B2 * | 7/2025 | Velagapudi | B65G 1/0492 |
| 2022/0297942 | A1 * | 9/2022 | Velagapudi | B65G 1/0492 |
| 2023/0286565 | A1 * | 9/2023 | Armbrust | B62B 5/0076 |
| 2024/0010255 | A1 * | 1/2024 | Smith | B62B 5/0033 |
| 2024/0375923 | A1 * | 11/2024 | Inagaki | B65G 41/02 |
| 2025/0346304 | A1 * | 11/2025 | Rosencrance | B60K 1/00 |
| 2025/0376201 | A1 * | 12/2025 | Epperson | B62B 3/02 |

FOREIGN PATENT DOCUMENTS

| | | | |
|---|---|---|---|
| JP | 09-11824 | A | 1/1997 |
| JP | 2010-36644 | A | 2/2010 |
| JP | 2019-091770 | A | 6/2019 |
| JP | 211844692 | U | 11/2020 |
| JP | WO 2021/144866 | A1 | 7/2021 |

* cited by examiner

CART AND TRANSPORT DEVICE

TECHNICAL FIELD

The present description relates to a cart movable while placing a transport object, and a transport device including the cart.

BACKGROUND ART

In recent years, in order to promote labor saving of distribution and production, application of an automated guided vehicle that transports a transport object in a distribution warehouse or a production plant has been advanced. Further, in order to handle a transport object exceeding a maximum load weight, a large and unstable transport object, or the like, an automated guided vehicle that travels while pulling a cart on which the transport object is placed is used. A technical example of this kind of pulling type cart and transport vehicle is disclosed in Patent Literature 1.

The component transport device disclosed in Patent Literature 1 includes a cart having a mounting section on which a tray is mounted and wheels, and an automated guided vehicle coupled to the cart via a coupling mechanism to be movable relative to the cart. Further, as an embodiment of the relatively movable coupling mechanism, a configuration is disclosed in which two sets of a circular opening provided in a cart and a shaft provided in an automated guided vehicle via an elastic member are provided, and the shaft moves inside the opening. With this, it is possible to appropriately manage the components by transporting the tray holding a large number of components.

PATENT LITERATURE

Patent Literature 1: JP-A-2019-91770

BRIEF SUMMARY

Technical Problem

Meanwhile, in the component transport device disclosed in Patent Literature 1, a relative positional relationship between the opening and the shaft may change due to a direction changing travel of the automated guided vehicle, expansion and contraction of the elastic member, or the like, and the transport device may travel in a state where the positional relationship and the posture (orientation) of the cart and the automated guided vehicle do not match. According to this, even when the automated guided vehicle stops at a regular stop position in a regular posture, the position or posture of the cart may be shifted. In this case, the tray on the cart may cause a problem in loading and unloading due to the deviation of the position or posture.

Therefore, in the present description, it is an object to provide a cart capable of managing a position and a posture when stopping with high accuracy, and a transport device including the cart.

Solution to Problem

According to an aspect of the present description, there is provided a cart including: a cart main body having a loading platform on which a transport object is placed and a traveling wheel: a coupling section configured to determine a position of the cart main body in a left-right direction with respect to a transport vehicle in a state of entering a lower side of the cart main body, and couple the cart main body to the transport vehicle so that the cart main body is pulled while allowing a posture change of the cart main body with respect to the transport vehicle; and a bumper section provided on a front of the cart main body in a front-rear direction, and configured to determine the position of the cart main body at a predetermined position in the front-rear direction by coming into contact with a reference surface provided at a transport target at at least two points separated in the left-right direction when the cart main body is pulled by the transport vehicle and moves to the transport target and cause the cart main body to directly face the reference surface.

In addition, according to another aspect of the present description, there is provided a transport device including: the above-described cart; and the transport vehicle configured to enter a lower side of the cart main body.

Advantageous Effects

In the cart or the transport device disclosed herein, the position of the cart main body is determined in the left-right direction with respect to the coupled transport vehicle, but the posture (orientation) of the cart main body with respect to the transport vehicle may change. Even in this case, when the cart is pulled by the transport vehicle and moves to the transport target, the position of the cart main body is determined at a predetermined position in the front-rear direction and is in a posture of directly facing the reference surface because at least two points separated in the left-right direction of the bumper section come into contact with the reference surface. As a result, the position and posture when the cart stops can be managed with high accuracy.

DESCRIPTION OF EMBODIMENTS

1. Overview of Transport Device 1

Figure 1:
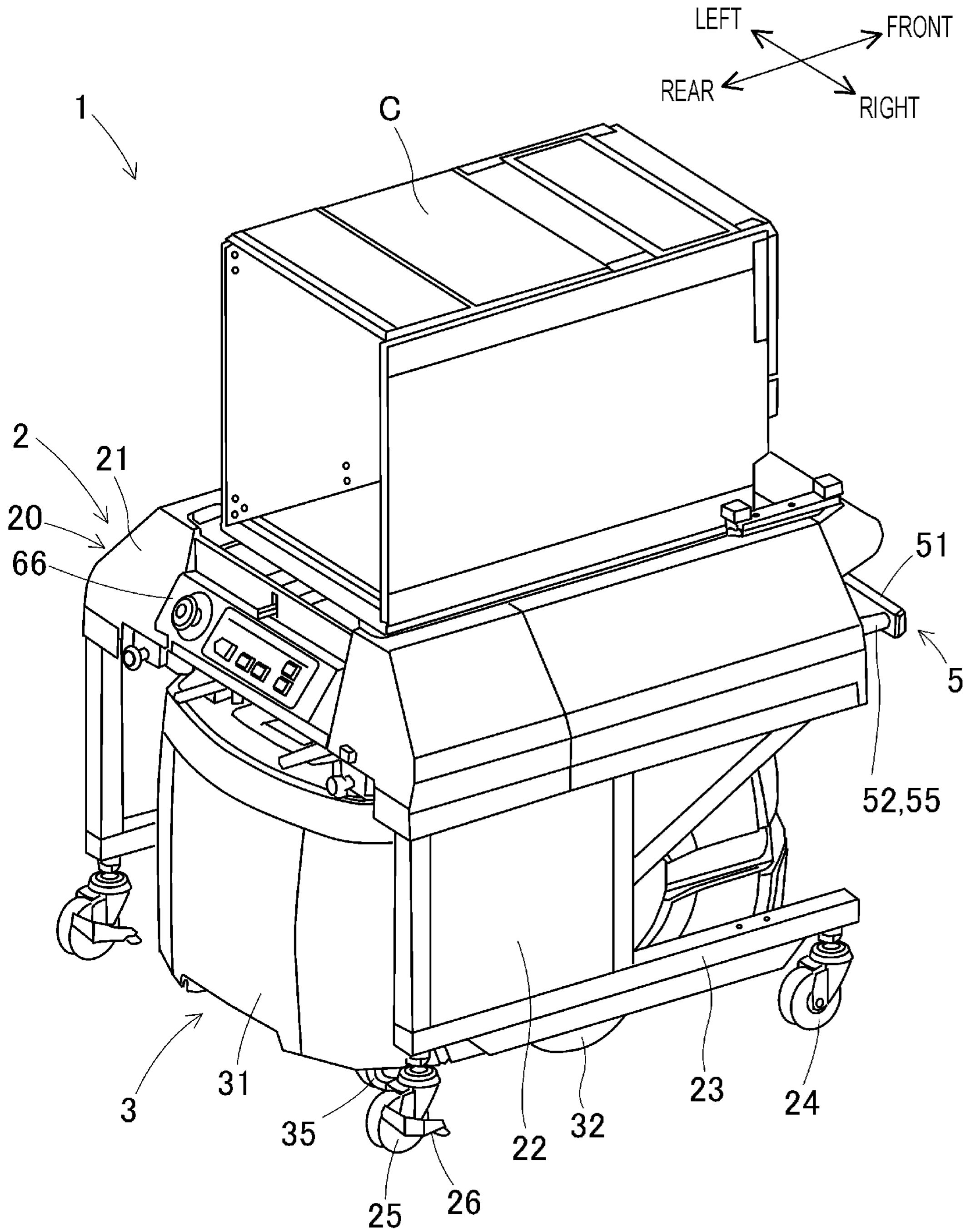
FIG. 1 is a perspective view of a transport device including a cart according to an embodiment, and illustrates a state in which a transport object is placed.

First, an overview of transport device 1 including cart 2 of an embodiment will be described with reference to FIG. 1. Transport device 1 includes cart 2 and transport vehicle 3. As indicated by an upper right arrow in FIG. 1, front, rear, left, and right sides of transport device 1, cart 2, and transport vehicle 3 are defined for convenience. Cart 2 and transport vehicle 3 are substantially symmetrical with respect to a center line extending in a front-rear direction. Cart 2 is coupled to transport vehicle 3 by coupling section 4 (details will be described later). Transport vehicle 3 enters the lower side of cart 2 from the rear, pulls and moves coupled cart 2, and exits to the rear of cart 2.

Transport device 1 transports transport object C between multiple transport targets. As transport object C, a storage case having an opening on the rear side can be exemplified. Transport object C (storage case) becomes heavy when the number of members to be stored inside from the opening portion is large, and may exceed a maximum load of transport vehicle 3. In accordance with this, transport device 1 transports transport object C by a method in which transport vehicle 3 pulls cart 2 on which transport object C is placed. In addition, as the transport target, storage device 8 (described in detail later) that stores transport object C can be exemplified.

2. Cart Main Body 20

Figure 2:
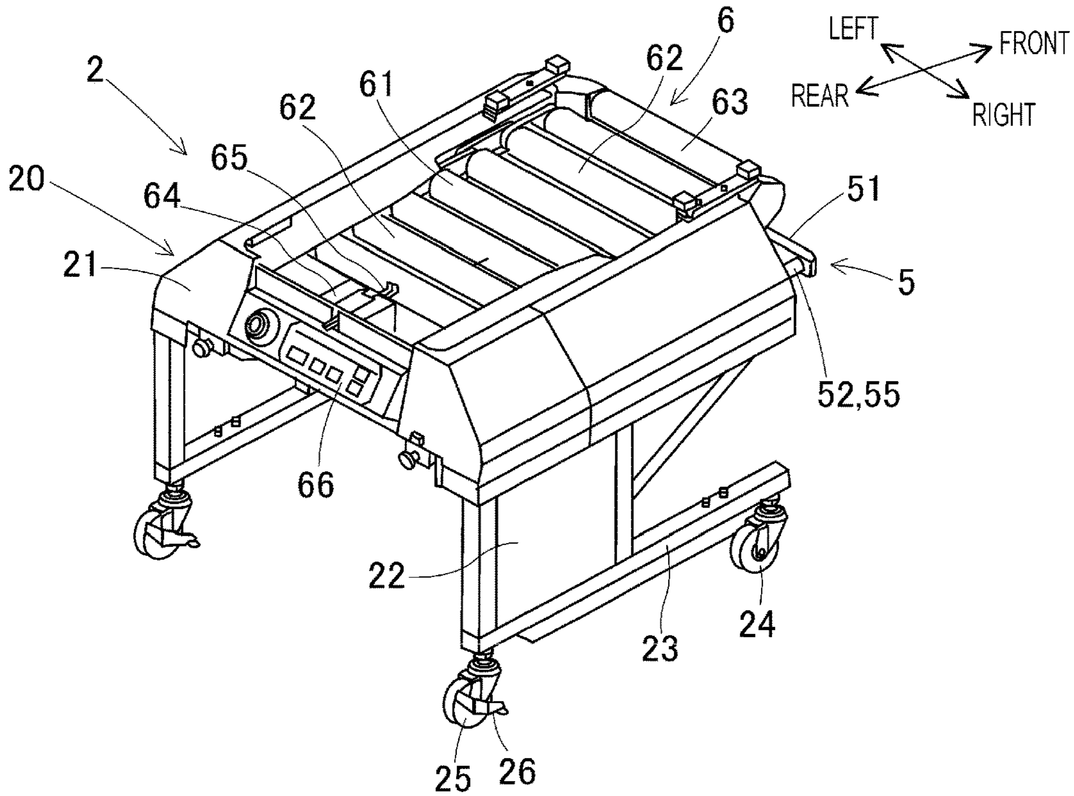
FIG. 2 is a single perspective view of the cart according to the embodiment.

Cart 2 according to the embodiment includes cart main body 20, coupling section 4, and position determination section 5 and the like. As illustrated in FIG. 2 and the like, cart main body 20 includes loading platform 21, left and right side surface portions 22, left and right leg portions 23, two front wheels 24, two rear wheels 25, and the like. In addition, a part of coupling section 4, position determination section 5, and movable-side communication sections 71 and 72 are disposed in loading platform 21 (this will be described later separately). Loading platform 21 is a part on which transport object C is placed. Loading platform 21 is formed in a substantially rectangular shape in a plan view, and is horizontally disposed away from a floor surface. Loading platform 21 has loading/unloading section 6 on an upper surface of loading platform 21.

Loading/unloading section 6 loads and unloads transport object C in the front-rear direction from the front of loading platform 21. Loading/unloading section 6 includes main roller 61, six drive rollers 62, guide roller 63, locking mechanism 64, operation panel 66, and a drive motor (not illustrated). The three types of rollers are columnar or cylindrical members extending in the left-right direction, and are supported to be rotatable about their central axes. Guide roller 63, three drive rollers 62, main roller 61, and three drive rollers 62 are arranged in this order from the front side to the rear side of loading platform 21.

Main roller 61 is driven by forward rotation and reverse rotation of the drive motor, and rotates in forward and reverse directions. Six drive rollers 62 are coupled to main roller 61 by a transmission belt (not illustrated), and rotate in the same rotation direction as main roller 61 in synchronization with each other at the same rotation speed. Guide roller 63 can rotate freely without a driving force applied thereto. Transport object C is loaded by the forward rotation of main roller 61 and drive roller 62, and transport object C is unloaded by the reverse rotation thereof. The control of the start and stop of the drive motor and the control in the rotation direction are performed by a cart control section (not illustrated).

Locking mechanism 64 is disposed behind rearmost drive roller 62. Locking mechanism 64 locks loaded transport object C using locking hook 65. The front side of locking hook 65 is bent upward, and locking hook 65 is supported by an elastic member to be swingable in the up-down direction. When transport object C is loaded, locking hook 65 automatically locks a locked portion provided at the rear end of transport object C by being once lowered and then raised. Further, locking hook 65 is automatically fitted into the locked hole provided in the bottom portion of transport object C. Meanwhile, immediately before transport object C is unloaded, locking hook 65 is driven downward by an electromagnetic solenoid (not illustrated) to release the locking of transport object C. The electromagnetic solenoid is controlled by the cart control section.

As described above, the loading/unloading operation of loading/unloading section 6 is automatically performed mainly under the control of the cart control section. Meanwhile, operation panel 66 disposed at the rear portion of loading platform 21 is used for manual operation of a part of loading/unloading section 6. For example, operation panel 66 is used for an error release operation or an emergency stop operation of loading/unloading section 6 when loading/unloading section 6 stops in error. In order for loading/unloading section 6 to perform a stable loading/unloading operation, it is important that cart 2 accurately stops at a stop position set for each transport target and directly faces the transport target.

Left and right side surface portions 22 are provided to extend downward from a left edge and a right edge of loading platform 21. A space into which transport vehicle 3 enters is defined between left and right side surface portions 22 on the lower side of loading platform 21. Left and right leg portions 23 extending in the front-rear direction are provided on the lower side of each of side surface portions 22. Traveling front wheel 24 is provided at a front lower portion of leg portion 23, and traveling rear wheel 25 is provided at a rear lower portion of leg portion 23. Total of four front wheels 24 and rear wheels 25 are free wheels whose traveling directions are variable. Stopper 26 is attached to each of two rear wheels 25.

Figure 5:
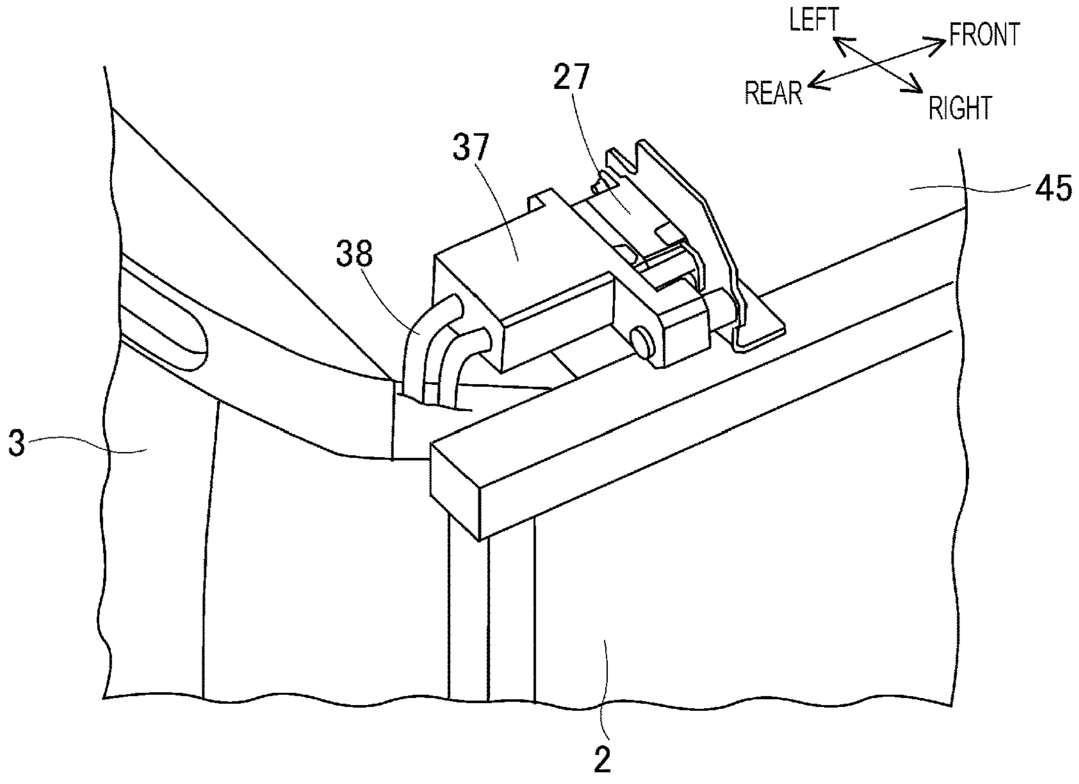
FIG. 5 is a partial perspective view illustrating a power receiving connector on the cart side and a power supply connector on the transport vehicle side.

Loading platform 21 further includes power receiving connector 27. As illustrated in FIG. 5, power receiving connector 27 is provided on the rear right side of the upper surface of bottom plate 45 of loading platform 21. Power receiving connector 27 is fitted to power supply connector 37 on transport vehicle 3 side. Power supply connector 37 is connected to a battery (not illustrated) built in transport vehicle 3 using power cable 38. Accordingly, power receiving connector 27 can receive electric power for driving loading/unloading section 6, the cart control section, and the electromagnetic solenoid from the battery on transport vehicle 3 side by being fitted to power supply connector 37. With this, cart 2 does not require a battery, and weight reduction is achieved.

3. Transport Vehicle 3

Figure 3:
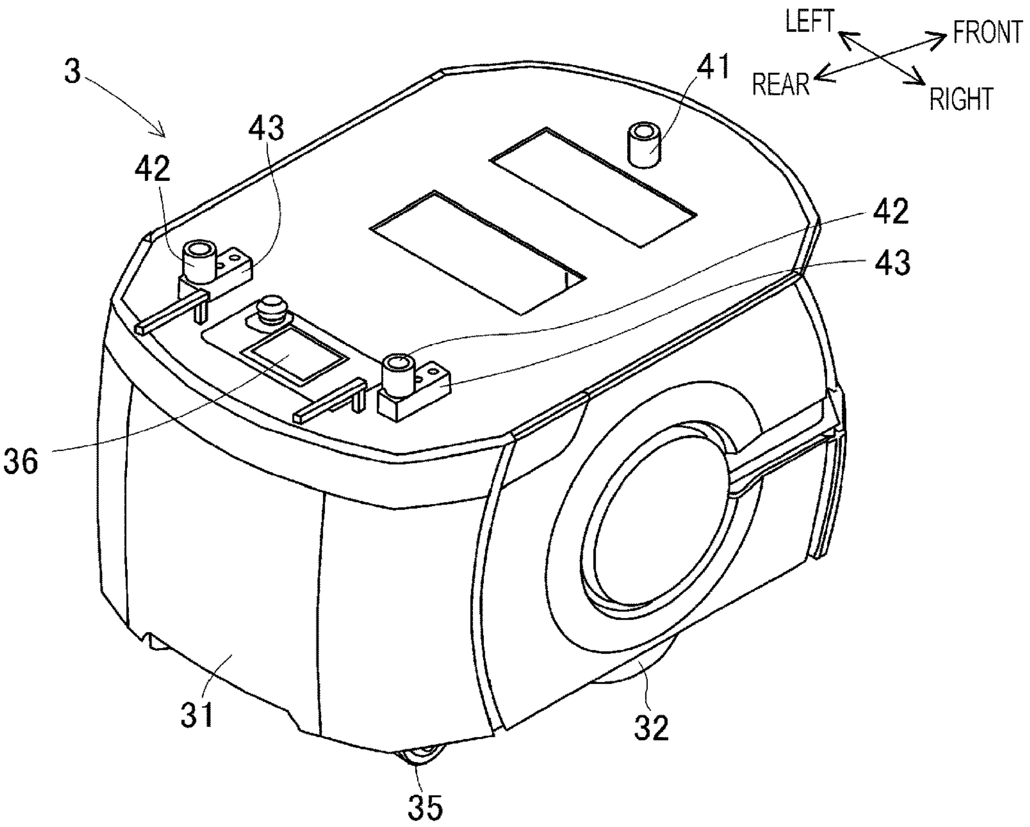
FIG. 3 is a single perspective view of a transport vehicle constituting the transport device.

As illustrated in FIG. 3 and the like, transport vehicle 3 includes vehicle main body 31, two drive wheels 32, two front wheels 34, two rear wheels 35, operation panel 36, above-described power supply connector 37, tape detection section 39, a traveling motor (not illustrated), and the like. In transport vehicle 3, the remaining part of coupling section 4 is disposed (this will be described later separately). Vehicle main body 31 has a rectangular parallelepiped shape elongated substantially in the front-rear direction, and is formed in a shape having four rounded corners in a plan view. Vehicle main body 31 is disposed horizontally and slightly away from the floor surface.

Figure 6:
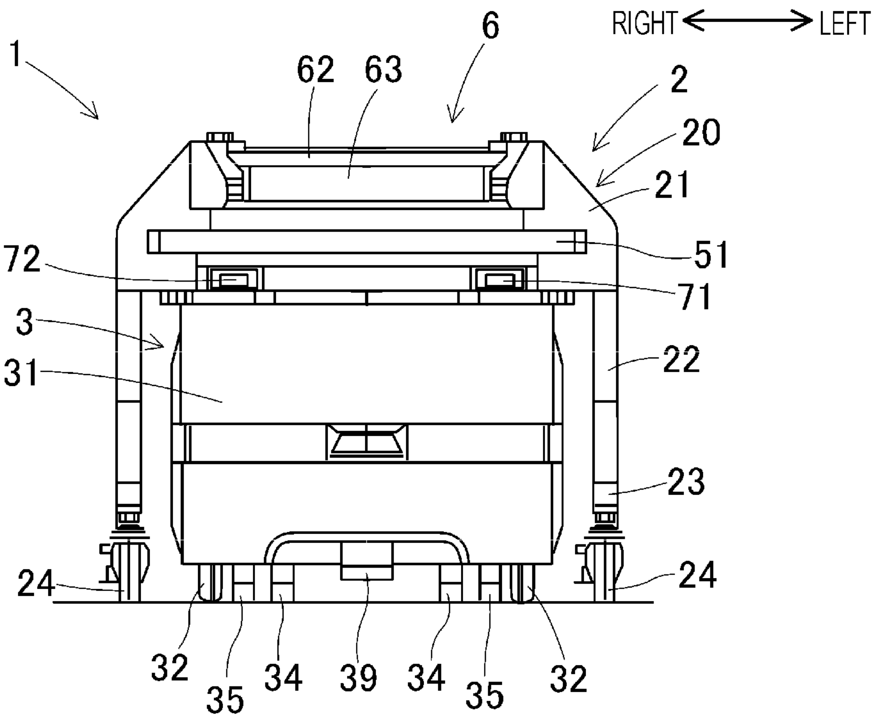
FIG. 6 is a front view of the transport device.
Figure 7:
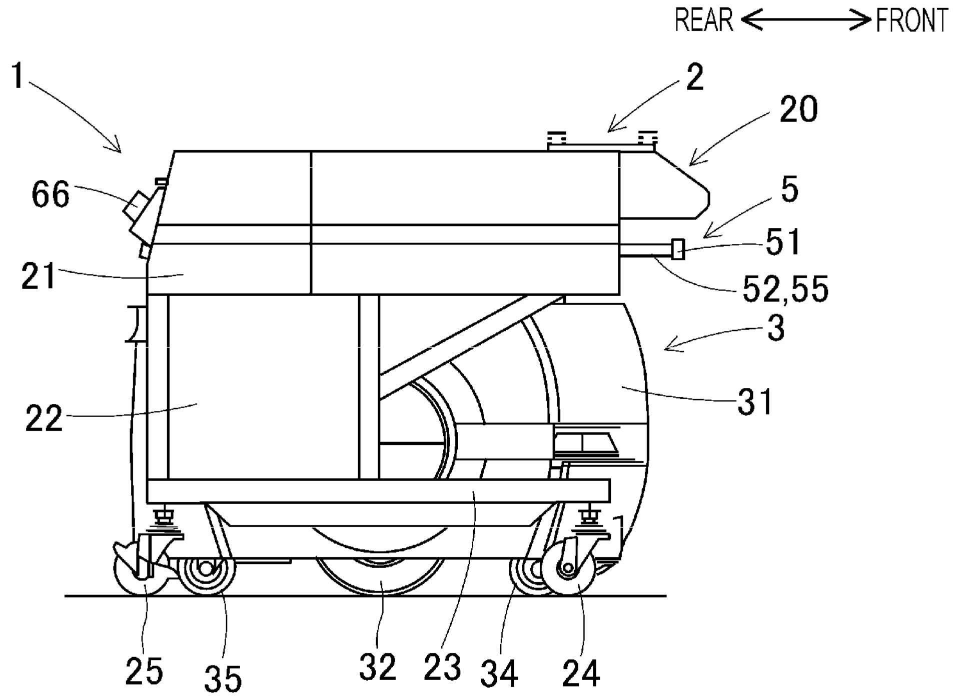
FIG. 7 is a right side view of the transport device.

Two drive wheels 32 are arranged side by side in the left-right direction at an intermediate position in the front-rear direction on the lower side of vehicle main body 31 (refer to FIGS. 6 and 7). Each of drive wheels 32 is driven by forward rotation and reverse rotation of a traveling motor. Two drive wheels 32 can rotate at mutually different rotational speeds or in mutually different rotational directions. Accordingly, transport vehicle 3 can freely move forward, backward, and change in direction. The start, stop, and control in the rotation direction of the traveling motor and the adjustment of the travel driving force output from the traveling motor are performed by a transport vehicle control section (not illustrated). As a matter of course, the rotational speed of drive wheels 32 and the traveling speed of transport vehicle 3 change according to an increase or decrease in the travel driving force.

Two front wheels 34 are disposed at positions close to the front on the lower side of vehicle main body 31 to be separated from each other in the left-right direction. Two rear wheels 35 are disposed at positions close to the rear on the lower side of vehicle main body 31 to be separated from each other in the left-right direction. Total of four front wheels 34 and rear wheels 35 are free wheels whose traveling direction can be changed. Front wheels 34 and rear wheels 35 rotate following the rotation situations of two drive wheels 32. As illustrated in FIG. 6, a distance between the left and right wheels, that is, a tread width is the maximum at drive wheels 32, the minimum at front wheels 34, and an intermediate value at rear wheels 35. Since the tread width of drive wheels 32 is maximum, good steering performance of transport vehicle 3 is ensured.

Tape detection section 39 is provided in a pair of front and rear forms at a front position and a rear position on the center line on the lower side of vehicle main body 31 (refer to FIG. 6). Tape detection section 39 detects route display tape 3A (refer to FIG. 10) provided on the floor surface, and outputs the detection result to the transport vehicle control section. Route display tape 3A displays a travel route of transport vehicle 3. The transport vehicle control section causes transport vehicle 3 to travel along route display tape 3A. A magnetic display tape or an optical display tape can be used as route display tape 3A. Tape detection section 39 is a detection method corresponding to the display method of route display tape 3A.

Further, tape detection section 39 can detect branch point 3B of the travel route indicated by route display tape 3A. The travel route after transport vehicle 3 passes through branch point 3B is selected by the transport vehicle control section. The transport vehicle control section calculates and estimates the current position, the posture (orientation), and the traveling speed of transport vehicle 3 using the detection result of route display tape 3A by tape detection section 39 and the control amount of drive wheels 32, and controls the subsequent traveling of transport vehicle 3 based on these.

As described above, transport vehicle 3 travels automatically under the control of the transport vehicle control section. Meanwhile, operation panel 36 disposed at the rear portion of the upper surface of vehicle main body 31 is used for manual operation of a part of transport vehicle 3. For example, operation panel 36 is used for an error release operation or an emergency stop operation of transport vehicle 3 when transport vehicle 3 performs an error stop.

4. Coupling Section 4

Figure 4:
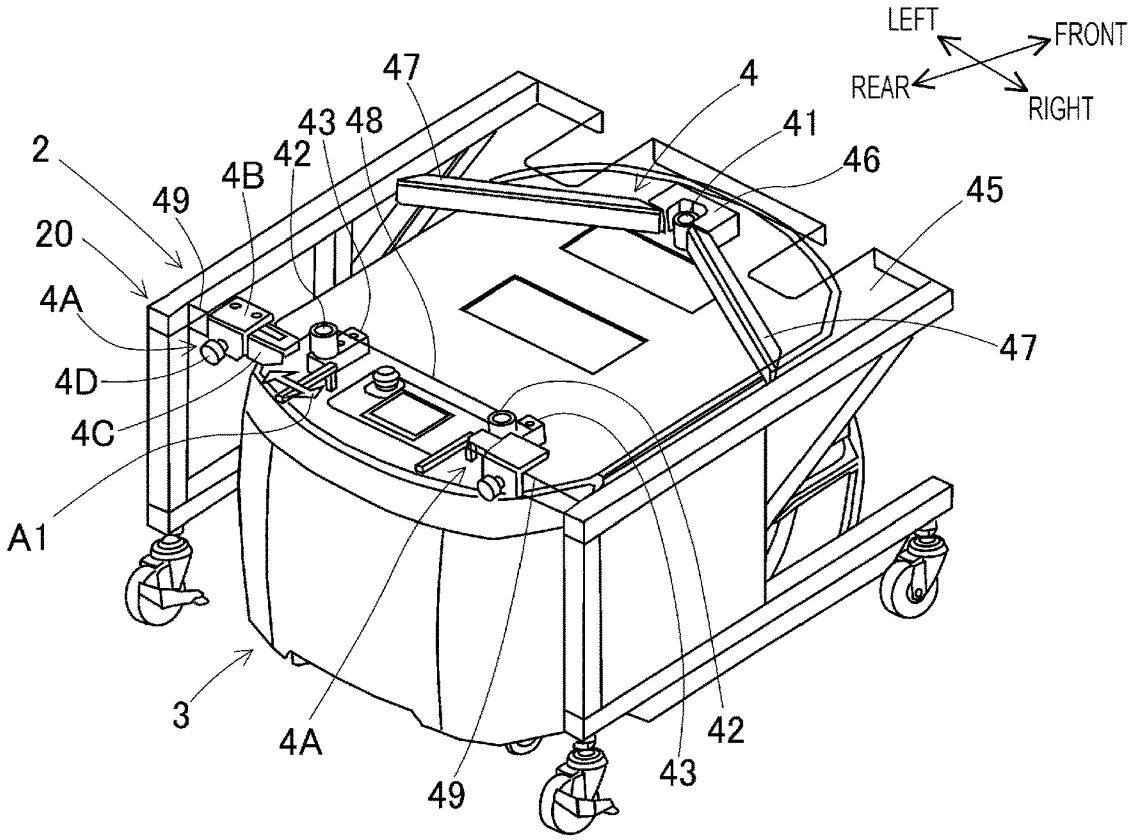
FIG. 4 is a partially transparent perspective view illustrating a configuration of a coupling section.

As illustrated in FIG. 4, coupling section 4 is disposed between bottom plate 45 at the lower portion of loading platform 21 and the upper surface of transport vehicle 3. Coupling section 4 couples cart main body 20 to transport vehicle 3 in a state of entering the lower side of cart main body 20 so that cart main body 20 can be pulled. Coupling section 4 includes three coupling pins provided on the upper surface of transport vehicle 3, front locking member 46 provided on bottom plate 45 of loading platform 21, a pair of left and right switching mechanisms 4A, or the like. In FIG. 4, bottom plate 45 is seen through.

As illustrated in FIGS. 3 and 4, front coupling pin 41 is provided upright at a position close to the front of the center in the left-right direction of the upper surface of transport vehicle 3. Front coupling pin 41 is formed by fitting a cylindrical urethane rubber on the outer peripheral side of a metallic round rod. Pair of left and right rear coupling pins 42 are provided upright at positions of a right rear portion and a left rear portion of the upper surface of transport vehicle 3. Rear coupling pin 42 is formed of the same material and in the same shape as front coupling pin 41. Rear coupling pin 42 is attached to the upper surface of transport vehicle 3 via spacer 43, and is disposed higher than front coupling pin 41.

Meanwhile, a front edge and a rear edge of bottom plate 45 of loading platform 21 are bent downward. Front locking member 46 is provided at a position close to the front of the center in the left-right direction of the lower surface of bottom plate 45. Front locking member 46 is formed in a crank shape in a plan view, and has a storage section that opens rearward. The storage section of front locking member 46 has a tapered inner wall surface which has a narrowest portion at a substantially intermediate height and is expanded vertically. The opening width dimension of the narrowest portion of front locking member 46 is set to be substantially equal to the diameter of front coupling pin 41 or to be equal to the diameter of front coupling pin 41 while allowing a negative tolerance.

When transport vehicle 3 enters the lower side of cart main body 20, front coupling pin 41 enters the storage section of front locking member 46 from the rear. Front coupling pin 41 is inscribed in the narrowest portion of front locking member 46 and is not in substantially contact with the inner wall surface other than the narrowest portion. Further, when front coupling pin 41 is inscribed in the narrowest portion, the urethane rubber on the outer peripheral side is allowed to be slightly deformed. Accordingly, the storage section of front locking member 46 locks front coupling pin 41 and does not allow movement in the left-right direction. Accordingly, the position of cart main body 20 in the left-right direction with respect to transport vehicle 3 is determined. Meanwhile, the storage section of front locking member 46 allows front coupling pin 41 to fall in the left-right direction and the front-rear direction. Accordingly, a relative inclination of cart main body 20 in the left-right direction and the front-rear direction with respect to transport vehicle 3 is allowed, and thus, transport vehicle 3 and cart 2 can travel smoothly even when undulation occurs on the floor surface. Front coupling pin 41 is relatively movable in the front-rear direction in the storage section of front locking member 46.

Further, pair of left and right rod-shaped or plate-shaped guide members 47 are provided on the lower side of bottom plate 45. Pair of left and right guide members 47 are obliquely disposed to gradually approach the storage section of front locking member 46 from the rear side to the front side of loading platform 21. Guide member 47 guides front coupling pin 41 toward the storage section of front locking member 46 in a case where the center lines of transport vehicle 3 and cart main body 20 are deviated when transport vehicle 3 enters the lower side of cart main body 20.

The rear edge of bottom plate 45 includes crank edge portion 48 whose central portion is cut out in a crank shape and left and right rear edge portions 49 which are not cut out. Switching mechanism 4A is provided at each of left and right rear edge portions 49. Each of pair of left and right switching mechanisms 4A includes mechanism main body 4B, rear locking member 4C, and operation knob 4D or the like.

Mechanism main body 4B is fixed to rear edge portion 49. Rear locking member 4C is a plate-shaped member bent in a mountain shape. Rear locking member 4C is supported by mechanism main body 4B to be slidable (refer to arrow A1 in FIG. 4) in the left-right direction. In other words, rear locking member 4C is supported to be movable between a locking position where rear locking member 4C protrudes from mechanism main body 4B in the direction of the center line and a non-locking position where rear locking member 4C is housed in mechanism main body 4B. In the initial state of switching mechanism 4A, rear locking member 4C is located at the non-locking position. Operation knob 4D is provided in mechanism main body 4B. By rotating operation knob 4D, rear locking member 4C moves between the non-locking position and the locking position.

When rear locking member 4C is at the non-locking position, rear locking member 4C allows rear coupling pin 42 to pass through in the front-rear direction, and allows transport vehicle 3 to enter and exit the lower side of cart main body 20. As illustrated in FIG. 4, when transport vehicle 3 enters the lower side of cart main body 20 and front coupling pin 41 is locked to front locking member 46, pair of left and right rear coupling pins 42 enters the inside of the crank shape of crank edge portion 48 and protrudes to a position above crank edge portion 48.

When the operator rotates operation knob 4D, rear locking member 4C slides from the non-locking position to the locking position and is positioned behind rear coupling pin 42. When rear locking member 4C is at the locking position, rear locking member 4C prevents rear coupling pin 42 from passing rearward and does not allow transport vehicle 3 to exit from the lower side of cart main body 20.

In this state, a gap corresponding to a play dimension in the front-rear direction is generated between rear coupling pin 42 and crank edge portion 48 and between rear coupling pin 42 and rear locking member 4C. That is, crank edge portion 48 and rear locking member 4C lock the rear coupling pin to be relatively movable in the front-rear direction within a range of a predetermined play dimension. Accordingly, front coupling pin 41 and rear coupling pin 42 are movable relative to each other in the front-rear direction. With this, the position of cart main body 20 in the front-rear direction with respect to transport vehicle 3 is not determined.

Meanwhile, a gap corresponding to the play dimension in the left-right direction is formed between rear coupling pin 42 and crank edge portion 48. That is, crank edge portion 48 functions as a locking member that locks rear coupling pin 42 to be relatively movable within the range of the play dimension in the left-right direction. With this, the rear portion of cart main body 20 can rotate in the left-right direction about front coupling pin 41. In other words, the posture change of cart main body 20 with respect to transport vehicle 3 is allowed.

Thereafter, the fitting operation of power receiving connector 27 and power supply connector 37 is performed, and the coupling process between cart 2 and transport vehicle 3 is completed. When transport vehicle 3 moves forward while pulling cart 2, front coupling pin 41 pushes front locking member 46. When transport vehicle 3 moves backward while pulling cart 2, rear coupling pin 42 pushes rear locking member 4C. There is a possibility that the position and posture of cart 2 in the front-rear direction with respect to transport vehicle 3 may change at any time when transport vehicle 3 moves forward, moves backward, or changes the direction.

Further, even when front coupling pin 41 is displaced by a predetermined displacement amount in the vertical direction with respect to front locking member 46, front locking member 46 continues to lock front coupling pin 41. Similarly, even when rear coupling pin 42 is displaced by a predetermined displacement amount in the vertical direction with respect to crank edge portion 48 and rear locking member 4C, crank edge portion 48 and rear locking member 4C continue to lock rear coupling pin 42. The dimensions and shapes of front coupling pin 41, rear coupling pin 42, and other members are designed to achieve the above-described functions.

With this, coupling section 4 allows the posture change of cart main body 20 in the vertical direction with respect to transport vehicle 3. That is, cart main body 20 is allowed to move up and down with respect to transport vehicle 3. Further, when transport vehicle 3 is in the horizontal posture, cart main body 20 is allowed to be in an inclined posture inclined in the front-rear direction or the left-right direction, and conversely, transport vehicle 3 is in the inclined posture and cart main body 20 is allowed to be in the horizontal posture. Accordingly, even when the traveling floor surface has undulations or some steps, transport vehicle 3 can continue to travel while pulling cart 2.

5. Position Determination Section 5

Figure 8:
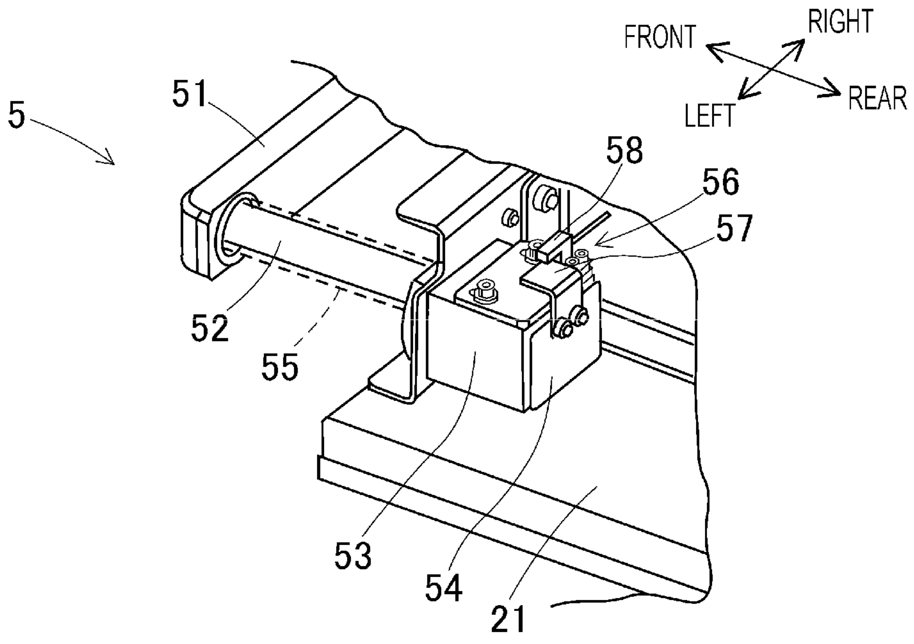
FIG. 8 is a partial perspective view illustrating a bumper section, a support section, an elastic member, and a detection section that constitute a position determination section.

As illustrated in FIG. 8, position determination section 5 is provided at a front portion of loading platform 21 of cart main body 20. Position determination section 5 is a part that causes cart main body 20 to directly face a reference surface provided as a transport target. Position determination section 5 includes bumper section 51, support section 53, elastic member 55, detection section 56, or the like.

Bumper section 51 is provided on the front of loading platform 21 in the front-rear direction and extends in the left-right direction (refer to FIGS. 2, 6, and 7). Bumper section 51 is formed in a linear rod shape that is horizontally disposed using, for example, metal or hard resin having high mechanical strength. Both ends of the front surface of bumper section 51 are rounded like a chamfer.

Bumper section 51 is located rearward of the front end of loading platform 21. Even in this case, bumper section 51 comes into contact with the reference surface provided on the transport target before loading platform 21 collides with the transport target. In this case, bumper section 51 can come into contact with the reference surface at least at two points separated in the left-right direction. Bumper section 51 includes pair of left and right support rods 52 extending rearward from left and right symmetrical positions on the rear surface thereof. As support rod 52, for example, a round rod formed of metal or hard resin can be used.

Meanwhile, pair of left and right support sections 53 are provided on the front of loading platform 21 of cart main body 20 (refer to FIG. 8). Support section 53 has a support hole penetrating in the front-rear direction, and supports support rod 52 movably in the front-rear direction using the support hole. In other words, support section 53 supports bumper section 51 to be movable in parallel in the front-rear direction with respect to cart main body 20. Support rod 52 has contact plate 54 on the rear side passing through support section 53. Contact plate 54 is formed to be larger than the outer diameter of the support hole, and prevents support rod 52 from coming out of support section 53 to the front side.

Elastic member 55 is provided between bumper section 51 and support section 53, and surrounds the outer circumferential surface of support rod 52. A cylindrical coil spring is used as elastic member 55. Elastic member 55 has elasticity that expands and contracts in the front-rear direction and is assembled in a compressed state. That is, elastic member 55 biases bumper section 51 forward with respect to cart main body 20. Accordingly, a state in which contact plate 54 is in contact with support section 53 at the normal time is maintained. Elastic member 55 is further compressed when bumper section 51 comes into contact with the reference surface, and serves as a buffer material that reduces shock.

Detection section 56 detects that bumper section 51 comes into contact with the reference surface. Detection section 56 includes sensor dog 57, light shielding detection sensor 58, or the like. Sensor dog 57 is formed of a bent plate material and is attached to the rear surface of contact plate 54. Sensor dog 57 extends upward from the rear surface of contact plate 54 and is further bent forward. Light shielding detection sensor 58 is provided above support section 53. Light shielding detection sensor 58 has a light projecting section and a light receiving section separated in the up-down direction, and detects whether the detection light projected in the up-down direction is shielded.

As illustrated in FIG. 8, in a state in which contact plate 54 is in contact with support section 53 in a normal state, sensor dog 57 enters between the light projecting section and the light receiving section of light shielding detection sensor 58. Then, light shielding detection sensor 58 detects the light shielding state. In the present embodiment, the light shielding state detected by light shielding detection sensor 58 indicates that bumper section 51 is not in contact with the reference surface.

Figure 9:
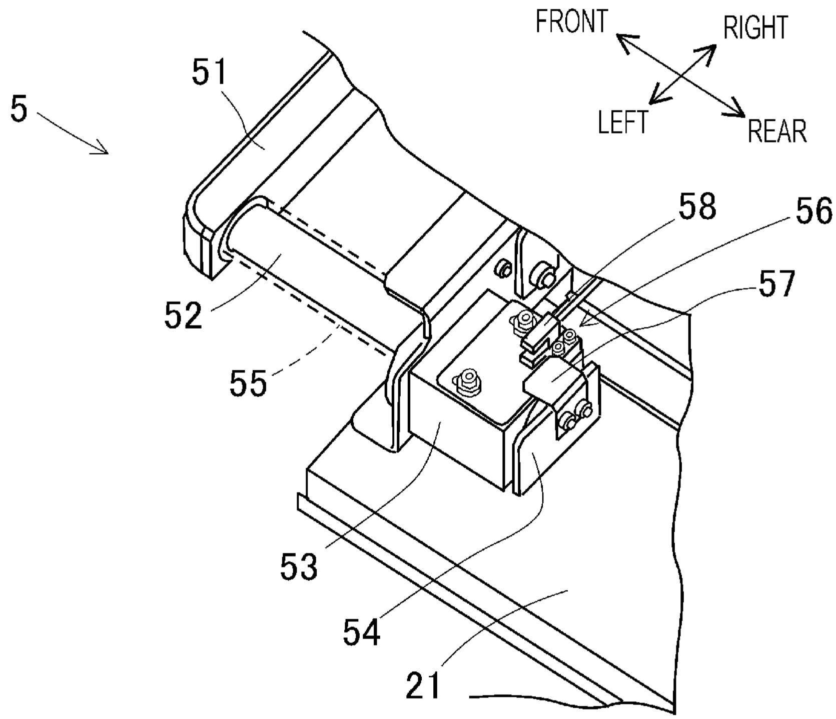
FIG. 9 is a partial perspective view illustrating a state in which the detection section detects that the bumper section comes into contact with a reference surface.

Meanwhile, when cart 2 is pulled and bumper section 51 comes into contact with the reference surface, a travel driving force is applied from transport vehicle 3 to cart 2. Bumper section 51 is pressed against the reference surface by the travel driving force, and elastic member 55 is compressed. Accordingly, as illustrated in FIG. 9, bumper section 51, support rod 52, contact plate 54, and sensor dog 57 move backward relative to cart main body 20. In this case, sensor dog 57 exits from between the light projecting section and the light receiving section of light shielding detection sensor 58. Then, light shielding detection sensor 58 detects the light receiving state. In the present embodiment, the light receiving state detected by light shielding detection sensor 58 indicates that bumper section 51 is in contact with the reference surface.

Light shielding detection sensor 58 outputs a detection result to the cart control section. Accordingly, the cart control section can recognize a state in which bumper section 51 is in contact with the reference surface. As described above, cart 2 includes two sets of support sections 53 and elastic members 55 disposed at symmetrical positions in the left-right direction of bumper section 51. Accordingly, the relative backward movement of bumper section 51 with respect to cart main body 20 is smoothed. In addition, although it is preferable that detection section 56 is provided in a pair of left and right forms and corresponds to the left-right asymmetric operation of bumper section 51, detection section 56 may be simplified to only one of the left and right sides.

6. Storage Device 8 and the Like

Figure 10:
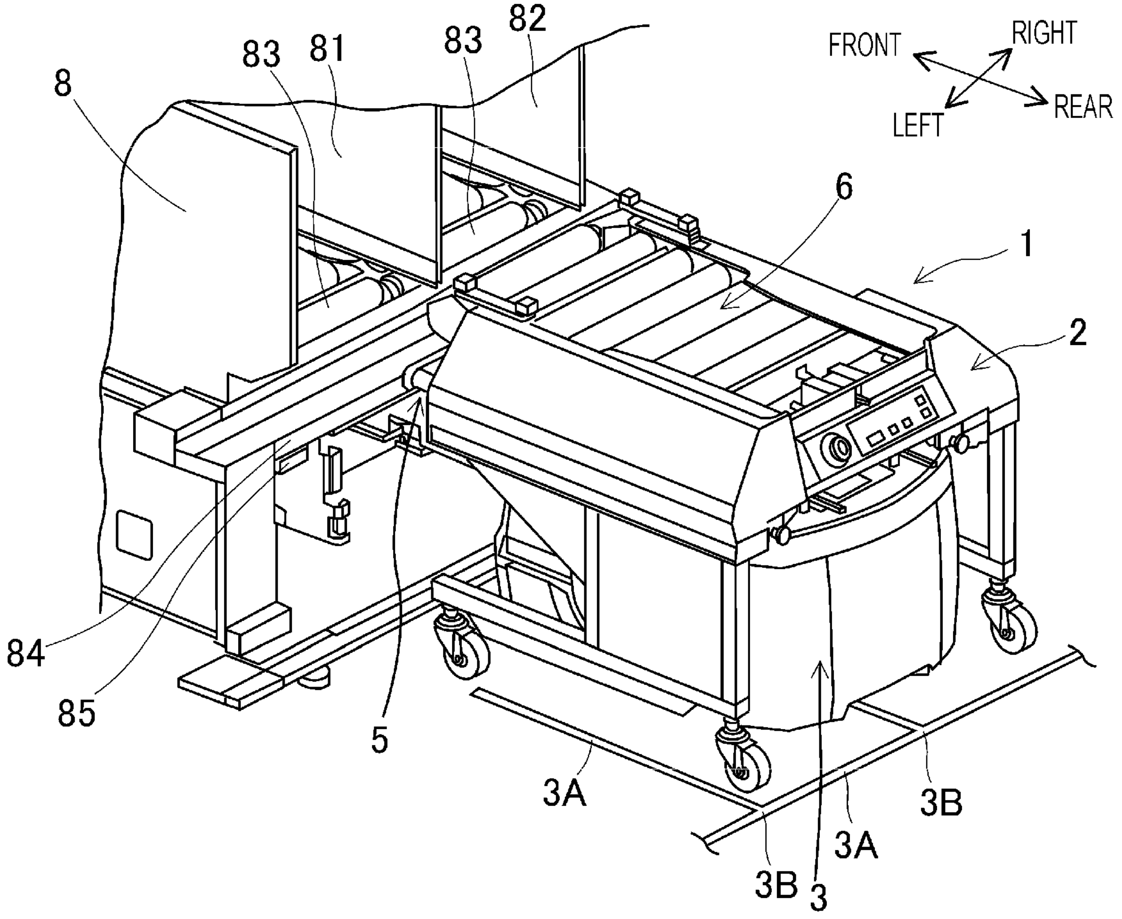
FIG. 10 is a perspective view illustrating a situation in which the transport device travels to a transport target.
Figure 11:
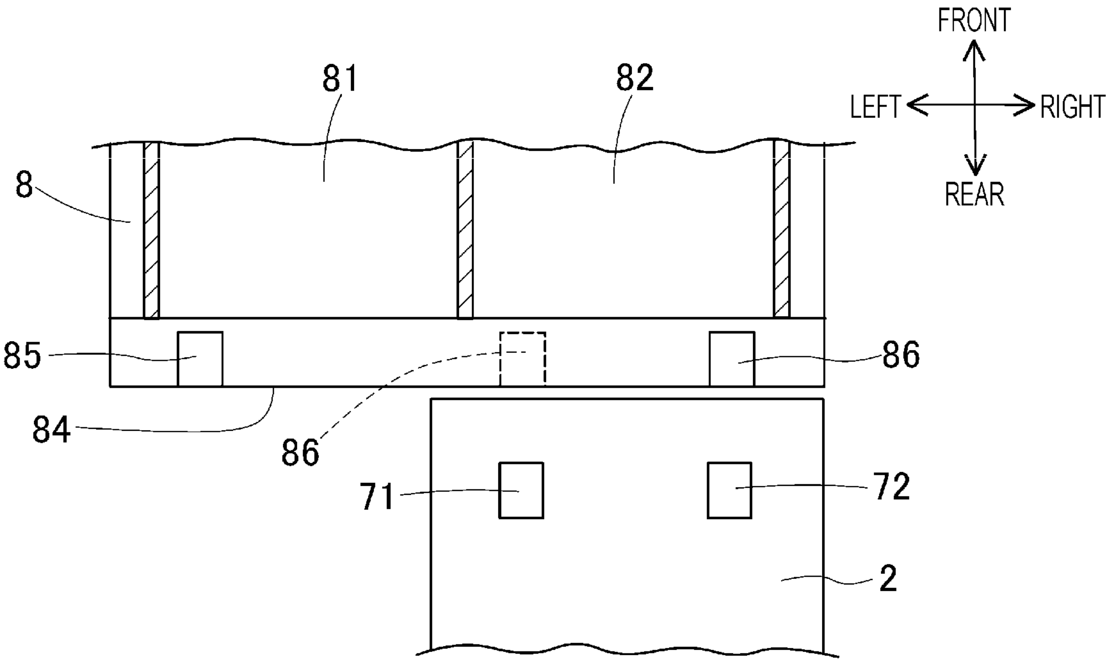
FIG. 11 is a plan view schematically illustrating configurations and functions of a fixed-side communication section and a movable-side communication section.

Next, storage device 8 as an example of the transport target will be described with reference to FIGS. 10 and 11. Storage device 8 is a device having a substantially rectangular parallelepiped shape, and can store two transport objects C. Storage device 8 includes first storage position 81, second storage position 82, reference surface 84, first fixed-side communication section 85, and second fixed-side communication section 86. In FIGS. 10 and 11, cart 2 and transport vehicle 3 directly face reference surface 84 behind second storage position 82. Note that "directly facing" indicates that the center lines of cart 2 and transport vehicle 3 are accurately orthogonal to reference surface 84.

First storage position 81 corresponds to a storage space having a rectangular parallelepiped shape that is partitioned in an upper left portion of storage device 8 and is open rearward. Second storage position 82 corresponds to a storage space having a rectangular parallelepiped shape that is partitioned in an upper right portion of storage device 8 and is open rearward. Roller conveyors 83 are respectively provided on the lower sides inside first storage position 81 and second storage position 82. Roller conveyor 83 is disposed at substantially the same height as loading/unloading section 6 on cart 2 side. Roller conveyor 83 is driven by a drive motor (not illustrated) controlled by a storage control section (not illustrated). Roller conveyor 83 operates in cooperation with loading/unloading section 6 to load and unload transport object C.

Reference surface 84 is provided on the lower rear side of the rear ends of first storage position 81 and second storage position 82. Reference surface 84 is disposed to stand in the vertical direction including the height of bumper section 51 on cart 2 side, and extends long in the left-right direction. Since reference surface 84 is provided behind first storage position 81 and second storage position 82, bumper section 51 comes into contact with reference surface 84 before loading platform 21 of cart 2 reaches first storage position 81 and second storage position 82. Accordingly, an appropriate positional relationship between storage device 8 and cart 2 is secured.

Reference surface 84 may be inclined and the front surface of bumper section 51 may also be inclined so that a downward reaction force acts on bumper section 51 from reference surface 84 when bumper section 51 comes into contact with reference surface 84. With this, when cart 2 moves forward and bumper section 51 comes into contact with reference surface 84, cart 2 becomes difficult to move backward.

First fixed-side communication section 85 is provided rearward at a position near the lower left end of reference surface 84 (refer to FIGS. 10 and 11). First fixed-side communication section 85 is provided below first storage position 81 to correspond to first storage position 81. Second fixed-side communication section 86 is provided rearward at a position near the lower right end of reference surface 84 (refer to FIG. 11). Second fixed-side communication section 86 is provided below second storage position 82 to correspond to second storage position 82. First fixed-side communication section 85 and second fixed-side communication section 86 are controlled by the storage control section. At a position near the center on the lower side of reference surface 84, a structure (not illustrated) becomes an obstacle, and a fixed-side communication section cannot be provided.

Meanwhile, as illustrated in FIG. 6, first movable-side communication section 71 and second movable-side communication section 72 are provided in cart main body 20 (loading platform 21). First movable-side communication section 71 is disposed to face forward at a position lower than bumper section 51 on the left side of the front of cart main body 20. Second movable-side communication section 72 is disposed to face forward at a position lower than bumper section 51 on the right side of the front of cart main body 20. First movable-side communication section 71 and second movable-side communication section 72 are controlled by the cart control section.

As illustrated in FIGS. 10 and 11, when cart 2 is located behind second storage position 82, second fixed-side communication section 86 and second movable-side communication section 72 directly face each other. Accordingly, second fixed-side communication section 86 and second movable-side communication section 72 can perform transmission and reception using the optical signal propagating in the direction orthogonal to reference surface 84. Accordingly, second movable-side communication section 72 and the cart control section can confirm that cart 2 is located behind second storage position 82. Meanwhile, second fixed-side communication section 86 and the storage control section can confirm that cart 2 has arrived behind second storage position 82. At this time, first fixed-side communication section 85 and first movable-side communication section 71 do not directly face each other.

When cart 2 is located behind first storage position 81, first fixed-side communication section 85 and first movable-side communication section 71 directly face each other. Accordingly, first fixed-side communication section 85 and first movable-side communication section 71 can perform transmission and reception using the optical signal propagating in the direction orthogonal to reference surface 84. Accordingly, first movable-side communication section 71 and the cart control section can confirm that cart 2 is located behind first storage position 81. Meanwhile, first fixed-side communication section 85 and the storage control section can confirm that cart 2 has arrived behind first storage position 81. In this case, second fixed-side communication section 86 and second movable-side communication section 72 do not directly face each other.

By the confirmation using the optical signal, the storage control section and the cart control section can accurately and quickly confirm the arrival position and the arrival time of cart 2. Accordingly, the storage control section can operate the side of two roller conveyors 83 on which cart 2 has arrived without mistake. In addition, roller conveyor 83 and loading/unloading section 6 operate in cooperation with each other by the cooperative control of the storage control section and the cart control section, so that transport object C can be efficiently loaded and unloaded.

In a case where there is temporarily no structure that becomes an obstacle and second fixed-side communication section 86 can be provided at a position near the center on the lower side of reference surface 84 as indicated by a broken line in FIG. 11, second movable-side communication section 72 can be omitted. In this aspect, when first fixed-side communication section 85 can communicate with first movable-side communication section 71, it can be confirmed that cart 2 is located behind first storage position 81, and when second fixed-side communication section 86 can communicate with first movable-side communication section 71, it can be confirmed that cart 2 is located behind second storage position 82.

7. Operations and Actions of Transport Device 1 and Cart 2

Next, operations and actions of transport device 1 and cart 2 will be described by taking a case where cart 2 moves to storage device 8 and stops as an example. In this case, transport vehicle 3 travels along route display tape 3A while pulling cart 2 coupled by coupling section 4, and approaches reference surface 84 of storage device 8 from a direction directly facing reference surface 84. At this time, the position of cart 2 in the left-right direction is fixed and does not change thereafter.

Further, transport vehicle 3 brings bumper section 51 into contact with reference surface 84 at a constant speed by making the travel driving force constant after approaching reference surface 84. The constant speed at this time may be a normal traveling speed of transport vehicle 3, or may be a lower speed. When bumper section 51 comes into contact with reference surface 84, cart 2 is not necessarily in the same posture (orientation) as transport vehicle 3 at any time, in other words, cart 2 is not necessarily directly facing reference surface 84.

Figure 12:
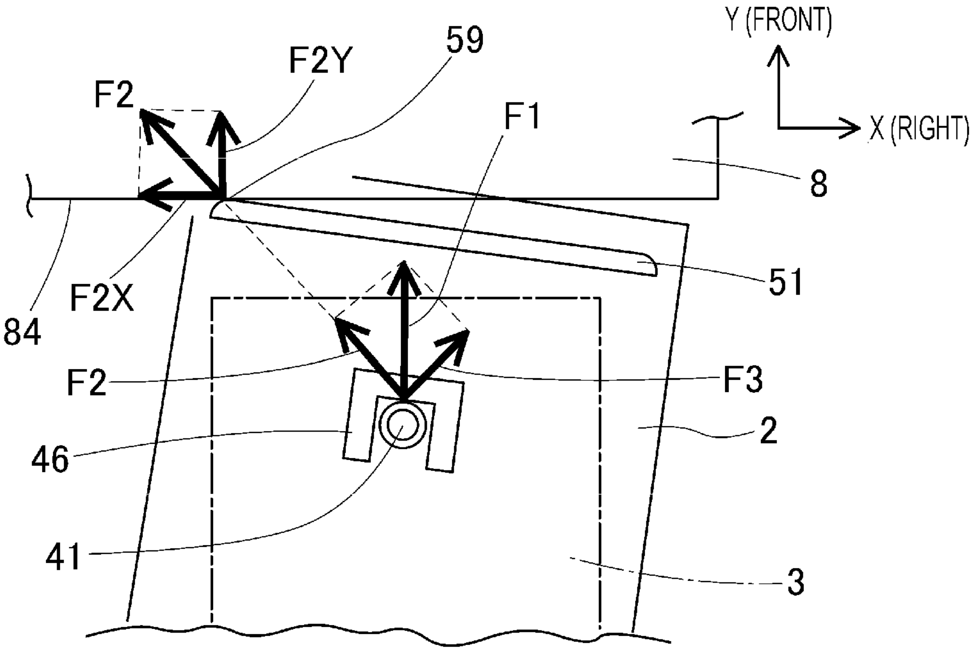
FIG. 12 is a plan view schematically illustrating an operation when postures of the cart and the transport vehicle are different from each other and a left front end of the bumper section comes into contact with the reference surface.

For example, in the example illustrated in FIG. 12, the posture of cart 2 is inclined rightward with respect to transport vehicle 3, and the left side of cart 2 protrudes forward. As indicated by the upper right arrow in FIG. 12, the right direction of transport vehicle 3 is defined as the X-axis direction, and the front direction is defined as the Y-axis direction. In this case, reference surface 84 extends parallel to the X-axis. In addition, in FIG. 12, in order to easily explain the action of the automatic correction of the posture of cart 2, the inclination of the posture of cart 2 is illustrated in an exaggerated manner.

As illustrated in the drawing, when cart 2 is inclined rightward with respect to transport vehicle 3, left front end 59 of bumper section 51 first comes into contact with reference surface 84. At this time, travel driving force F1 by which front coupling pin 41 of transport vehicle 3 presses front locking member 46 of cart 2 acts on bumper section 51 from cart main body 20 via elastic member 55. Travel driving force F1 can be considered to be divided into component force F2 in the obliquely left front direction toward left front end 59 and component force F3 in the obliquely right front direction. Further, component force F2 can be considered to be divided into component force F2Y in the Y-axis direction and component force F2X in the X-axis negative direction.

Component force F2Y is balanced and cancelled by the reaction force from reference surface 84. Due to the action of component force F2X, left front end 59 of bumper section 51 moves leftward while sliding on reference surface 84. Meanwhile, the X-axis direction component of component force F3 balances with ground contact friction resistances of front wheels 24 and rear wheels 25 and is cancelled out. Cart 2 is driven in the Y-axis direction by the action of the Y-axis direction component of component force F3. Accordingly, cart 2 advances in the Y-axis direction without moving in the X-axis direction (left-right direction) while left front end 59 of bumper section 51 moves leftward.

Accordingly, the posture of cart 2 is gradually changed counterclockwise in FIG. 12 about front coupling pin 41 as a rotation center, and automatically corrected to a posture parallel to transport vehicle 3. As a result, cart 2 takes a posture parallel to transport vehicle 3, and the entire front surface including left front end 59 and the right front end of bumper section 51 comes into contact with reference surface 84. That is, cart 2 can cause cart main body 20 to directly face reference surface 84 by bringing bumper section 51 into contact with reference surface 84 at least at two points separated from each other in the left-right direction. Accordingly, cart 2 directly faces reference surface 84.

Further, elastic member 55 is compressed as cart 2 moves forward. Finally, cart 2 and transport vehicle 3 stop at predetermined positions in a state where travel driving force F1 from transport vehicle 3 and the reaction force due to the compression of elastic member 55 are balanced. The stopped state is detected by light shielding detection sensor 58 of detection section 56 and recognized by the cart control section.

Here, since travel driving force F1 is constant at each stop, bumper section 51 is pressed against reference surface 84 with a predetermined pressing force by elastic member 55. With this, the compression amount of elastic member 55 is constant, and the stop position of cart 2 in the front-rear direction is stabilized. As described above, cart 2 can be made to directly face reference surface 84, and the stop position of cart 2 can be stabilized.

When travel driving force F1 is set to a great constant value, the predetermined position where cart 2 stops approaches reference surface 84, and when travel driving force F1 is set to a small constant value, the predetermined position moves away from reference surface 84. The magnitude of the shock when bumper section 51 comes into contact with reference surface 84 changes depending on travel driving force F1. Therefore, the magnitude of travel driving force F1 is set to an appropriate constant value based on the type and shape of the transport target, the shock resistance performance of transport object C, and the like.

In cart 2 and transport device 1 of the embodiment, the position of cart main body 20 in the left-right direction is determined with respect to the coupled transport vehicle 3, but the posture (orientation) with respect to transport vehicle 3 may change. Even in this case, when cart 2 is pulled by transport vehicle 3 and moves to storage device 8, at least two points separated in the left-right direction of bumper section 51 come into contact with reference surface 84, and thus, the position of cart main body 20 is determined at a predetermined position in the front-rear direction and takes a posture directly facing reference surface 84. As a result, the position and the posture when cart 2 stops can be managed with high accuracy.

8. Bumper Section 5A of Application Example

Figure 13:
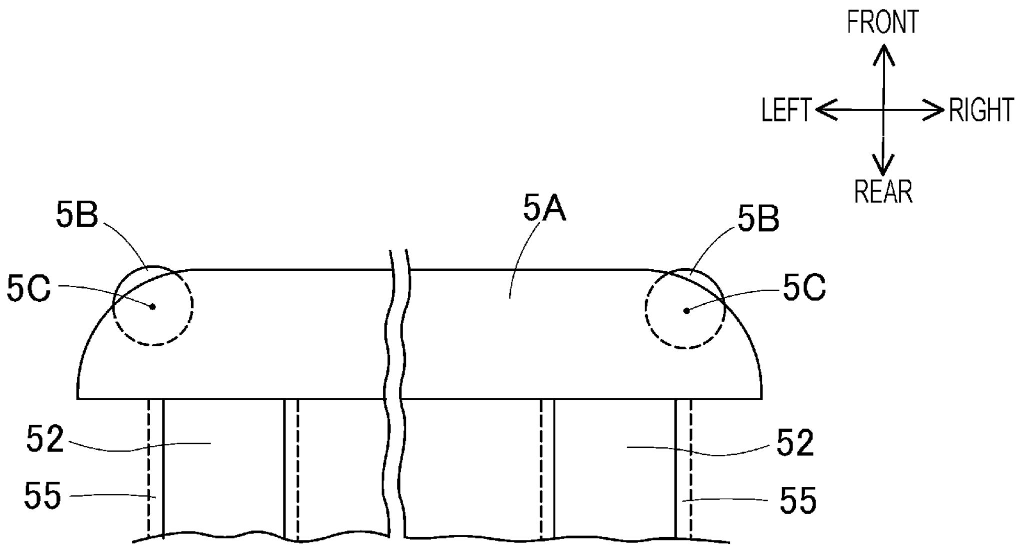
FIG. 13 is a plan view of a bumper section having a roller member.

Next, bumper section 5A of an application example will be described with reference to FIG. 13. Bumper section 5A of the application example is similar in size to bumper section 51 of the embodiment, and is different from the embodiment in that bumper section 5A has two roller members 5B. Roller members 5B are disposed at a left front end position and a right front end position of bumper section 5A, respectively.

Roller member 5B is formed in a columnar shape or a cylindrical shape around vertical axis 5C. Roller members 5B are attached to bumper section 5A to be rotatable about vertical axis 5C. A part of roller member 5B protrudes forward from the outer surface of the left front end and the outer surface of the right front end of bumper section 5A, and can come into contact with reference surface 84.

In the application example, the action of the automatic correction of the posture of cart 2 described with reference to FIG. 12 is similarly generated. When bumper section 5A moves in the left-right direction along reference surface 84, roller members 5B come into contact with reference surface 84. Therefore, when bumper section 5A moves in the left-right direction, a rolling frictional resistance smaller than the sliding frictional resistance is sufficient, and thus smooth movement is possible. As a result, the action of automatic correction of the posture of cart 2 becomes more reliable.

9. Position Determination Section of Modified Example

In the position determination section of the modified example, bumper section 51 or bumper section 5A is used, and the rear end of support rod 52 is directly fixed to cart main body 20. With this deformation, support section 53, contact plate 54, elastic member 55, and detection section 56 are omitted. In the modified example, since elastic member 55 is omitted, measures are taken against the concern of the positional deviation and the posture change of cart 2 due to the shock when bumper section 51 comes into contact with reference surface 84.

Specifically, when transport vehicle 3 pulls cart 2 and moves cart 2 to storage device 8, transport vehicle 3 approaches reference surface 84 while decelerating from the direction directly facing reference surface 84, and brings bumper sections 51 and 5A into contact with reference surface 84 at a speed lower than the normal traveling speed. Accordingly, the above-described shock can be reduced, and the above-described concern can be eliminated.

In the modified example, the action of the automatic correction of the posture of cart 2 described with reference to FIG. 12 is similarly generated. Further, since it is not necessary to consider the compression amount of the omitted elastic member 55, transport vehicle 3 only needs to be at a low speed at each stop, and does not need to be at a constant speed. Also in this case, cart 2 stops in a state where at least two points of bumper sections 51 and 5A separated in the left-right direction are in contact with reference surface 84, so that the stop position and the stop posture of cart 2 are stabilized.

10. Modification and Application of Embodiment

Bumper sections 51 and 5A are not limited to the linear rod shape described in the embodiment. For example, the bumper section may have a curved shape in which a left front end and a right front end protrude forward and a central portion is recessed rearward, or may be a separated type in which the bumper section is separated into left and right. The configuration of position determination section 5 including bumper sections 51 and 5A can be applied to a cart coupled to the rear side or the front side of transport vehicle 3.

Further, front coupling pin 41 and rear coupling pin 42 constituting coupling section 4 may be provided on cart 2 side, and front locking member 46 and switching mechanism 4A may be provided on transport vehicle 3 side. In addition, the travel route of transport vehicle 3 may be determined by a tape other than route display tape 3A. First movable-side communication section 71 and second movable-side communication section 72 may be provided in transport vehicle 3 instead of cart 2. Various modifications and applications in addition to the embodiments are possible.

REFERENCE SIGNS LIST

1: transport device, 2: cart, 20: cart main body, 21: loading platform, 24: front wheel, 25: rear wheel, 27: power receiving connector, 3: transport vehicle, 31: vehicle main body, 32: drive wheel, 37: power supply connector, 4: coupling section, 41: front coupling pin, 42: rear coupling pin, 45: bottom plate, 46: front locking member, 48: crank edge portion, 4A: switching mechanism, 4C: rear locking member, 5: position determination section, 51: bumper section, 53: support section, 55: elastic member, 56: detection section, 57: sensor dog, 58: light shielding detection sensor, 5A: bumper section, 5B: roller member, 6: loading/unloading section, 71: first movable-side communication section, 72: second movable-side communication section, 8: storage device, 84: reference surface, 85: first fixed-side communication section, 86: second fixed-side communication section, C: transport object

The invention claimed is:

1. A cart comprising:

a cart main body having a loading platform on which a transport object is placed and a traveling wheel;

a coupling section configured to determine a position of the cart main body in a left-right direction with respect to a transport vehicle in a state of entering a lower side of the cart main body and couple the cart main body to the transport vehicle so that the cart main body is pulled while allowing a posture change of the cart main body with respect to the transport vehicle; and a bumper section provided on a front of the cart main body in a front-rear direction, and configured to determine the position of the cart main body at a predetermined position in the front-rear direction by coming into contact with a reference surface provided at a transport target at at least two points separated in the left-right direction when the cart main body is pulled by the transport vehicle and moves to the transport target and cause the cart main body to directly face the reference surface.

2. The cart according to claim 1, further comprising a support section configured to support the bumper section to be movable in parallel in a front-rear direction with respect to the cart main body; and an elastic member configured to bias the bumper section forward with respect to the cart main body.

3. The cart according to claim 2, further comprising multiple sets of the support sections and the elastic members disposed at symmetrical positions of the bumper section in the left-right direction.

4. The cart according to claim 2, wherein the bumper section is pressed against the reference surface with a predetermined pressing force by the elastic member when the transport vehicle pulls the cart main body and moves to the transport target.

5. The cart according to claim 1, further comprising a detection section configured to detect that the bumper section comes into contact with the reference surface.

6. The cart according to claim 1, wherein the coupling section includes, a coupling pin provided perpendicularly to a first one of a lower surface of the cart main body and an upper surface of the transport vehicle, and a locking member provided on a second one of the lower surface of the cart main body and the upper surface of the transport vehicle and configured to lock the coupling pin to be relatively movable within a range of a predetermined play dimension in at least one direction of the left-right direction and the front-rear direction, and the coupling section allows a horizontal posture change of the cart main body with respect to the transport vehicle.

7. The cart according to claim 6, further comprising a switching mechanism configured to switch the locking member between a locking position and a non-locking position, wherein when the locking member is at the locking position, the transport vehicle is not allowed to exit from the lower side of the cart main body, and when the locking member is at the non-locking position, the transport vehicle is allowed to exit from the lower side of the cart main body.

8. The cart according to claim 1, wherein the coupling section allows a vertical posture change of the cart main body with respect to the transport vehicle.

9. The cart according to claim 1, wherein the loading platform includes, a loading/unloading section configured to load and unload the transport object in the front-rear direction from the front, and a power receiving connector fitted to a power supply connector of the transport vehicle and configured to receive power for driving the loading/unloading section.

10. The cart according to claim 1, further comprising a movable-side communication section provided in the cart main body and configured to directly face and communicate with a fixed-side communication section provided in the transport target.

11. The cart according to claim 10, wherein the transport target includes multiple storage positions at which the transport object is stored and multiple fixed-side communication sections provided corresponding to respectively the storage positions, and the movable-side communication section confirms the storage position to which the cart main body directly faces by allowing communication to be performed directly facing any of the fixed-side communication sections.

12. The cart according to claim 10, wherein the movable-side communication section and the fixed-side communication section transmit and receive an optical signal propagating in a direction intersecting the reference surface.

13. A transport device comprising:

the cart according to claim 1; and the transport vehicle configured to enter the lower side of the cart main body.

14. The transport device according to claim 13, wherein, when the transport vehicle pulls the cart and moves the cart to the transport target, the transport vehicle approaches the reference surface while decelerating from a direction directly facing the reference surface and brings the bumper section into contact with the reference surface at a speed lower than a normal traveling speed.

15. A cart comprising:

a cart main body having a loading platform on which a transport object is placed and a traveling wheel;

a coupling section configured to determine a position of the cart main body in a left-right direction with respect to a transport vehicle in a state of entering a lower side of the cart main body and couple the cart main body to a transport vehicle so that the cart main body is pulled;

a bumper section provided in the cart main body and configured to determine the position of the cart main body at a predetermined position in a front-rear direction by coming into contact with a reference surface provided in a transport target; and a detection section configured to detect that the bumper section comes into contact with the reference surface.

16. The cart according to claim 1, wherein the bumper section includes a roller member that is rotatable and is contactable with the reference surface.

* * * * *